United States Patent
Holtslag et al.

[11] Patent Number: 5,479,392
[45] Date of Patent: Dec. 26, 1995

[54] PHASE CHANGE RECORD CARRIES HAVING CRYSTALLINE NUCLEI AND/OR WHICH PRODUCE CRYSTALLIZATION STRUCTURES WHEN INFORMATION IS WRITTEN THEREON ENABLING THAT INFORMATION TO BE MORE EASILY ERASED

[75] Inventors: Antonius H. M. Holtslag; James H. Coombs; Wilma Van Es-Spiekman, all of Eindhoven, Netherlands

[73] Assignee: U.S. Philips Corporation, New York, N.Y.

[21] Appl. No.: 285,834

[22] Filed: Aug. 4, 1994

Related U.S. Application Data

[62] Division of Ser. No. 107,532, Aug. 17, 1993, Pat. No. 5,383,172.

[30] Foreign Application Priority Data

Aug. 19, 1992 [EP] European Pat. Off. .............. 92202541

[51] Int. Cl.[6] ..................................................... G11B 7/00
[52] U.S. Cl. .................. 369/116; 369/100; 369/275.2; 369/288; 430/270; 430/495
[58] Field of Search ........................... 369/100, 116, 369/175.2, 284, 288; 430/270, 495

[56] References Cited

U.S. PATENT DOCUMENTS

| | | | |
|---|---|---|---|
| 4,939,717 | 7/1990 | Ohno et al. | 369/116 |
| 4,980,879 | 12/1990 | Yamada et al. | 369/100 |
| 4,982,396 | 1/1991 | Yasuoka et al. | 369/100 |
| 5,060,222 | 10/1991 | Sawano et al. | 369/100 |
| 5,123,007 | 6/1992 | Miyauchi et al. | 369/116 |
| 5,268,254 | 12/1993 | Ueno et al. | 430/271 |

FOREIGN PATENT DOCUMENTS

| | | |
|---|---|---|
| 0337806 | 10/1989 | European Pat. Off. . |
| 0344317 | 12/1989 | European Pat. Off. . |

OTHER PUBLICATIONS

"Optical Memory", by P. Chaudhari and C. D. Zarowin, IBM Technical Disclosure Bulletin, vol. 16, No. 2, Jul. 1973, pp. 568–569.

*Primary Examiner*—Georgia Y. Epps
*Assistant Examiner*—Kim-Kwok Chu
*Attorney, Agent, or Firm*—Richard A. Weiss

[57] ABSTRACT

Information storage system, device and record carriers for improved erasing of information written on a record carrier. A radiation beam is focused on a recording layer of a record carrier containing phase-change material. Crystalline information areas are written on initially amorphous portions of the recording layer by means of the radiation beam having its intensity modulated in accordance with write pulses. The information areas are erased (and changed back into amorphous portions) by means of the radiation beam having its intensity modulated in accordance with erase pulses. The time duration of each of the erase pulses (and, therefore, the intensity of the radiation beam being modulated in accordance therewith to heat the recording layer) and the cooling time of the recording layer thereafter is short enough that areas of the recording layer which are heated during erasing to a temperature above the crystallization temperature of the recording layer but lower than the melting point of the recording layer remain above the crystallization temperature for a period of time which is shorter than the crystallization time for the recording layer. The recording layer may contain a track and have more crystallization nuclei proximate to a centerline of the track than away from the centerline. In addition, the record carrier may be such that its reflection is larger when the recording layer has an amorphous structure than when it has a crystalline structure.

3 Claims, 2 Drawing Sheets

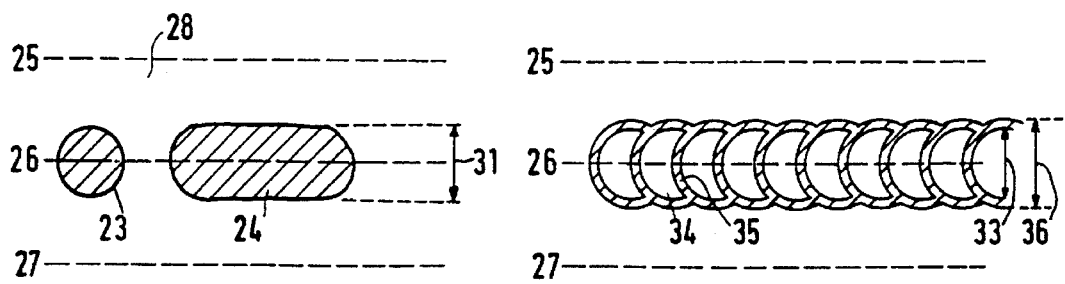
FIG. 3a
FIG. 3c
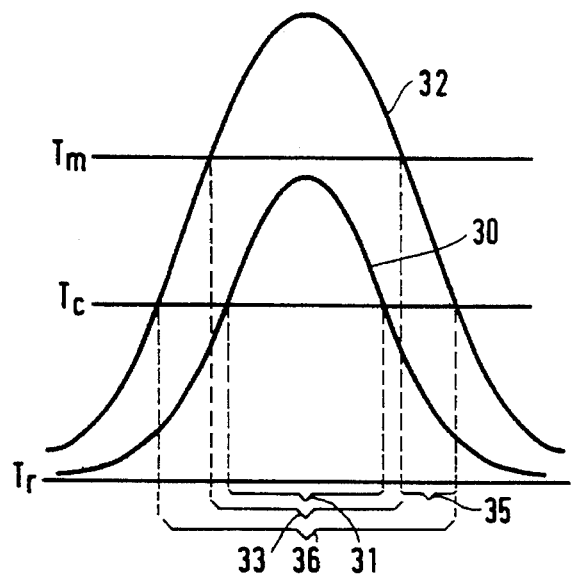
FIG. 3b
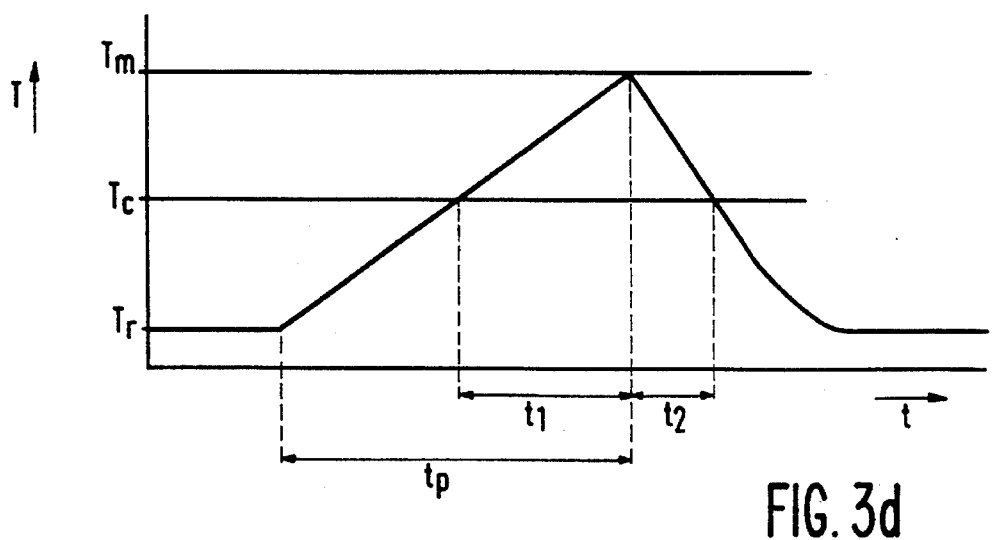
FIG. 3d

PHASE CHANGE RECORD CARRIES HAVING CRYSTALLINE NUCLEI AND/OR WHICH PRODUCE CRYSTALLIZATION STRUCTURES WHEN INFORMATION IS WRITTEN THEREON ENABLING THAT INFORMATION TO BE MORE EASILY ERASED

CROSS REFERENCE TO RELATED APPLICATION

This is a divisional of application Ser. No. 08/107,532, filed Aug. 17, 1993, now U.S. Pat. No. 5,383,172.

BACKGROUND OF THE INVENTION

The invention relates to record carriers. Such a record carrier has a recording layer in which information can be (a) written by changing an area of the recording layer having an amorphous structure by means of write pulses of a radiation beam into an information area having a crystalline structure and (b) erased by heating an information area above the melting point of the recording layer by means of erase pulses of a radiation beam.

A system which is capable of writing and erasing information on such a record carrier is known from an article entitled "Optical memory" by P. Chaudhari and C. B. Zarowin in the IBM Technical Disclosure Bulletin, vol. 16, no. 2, July 1973, pp. 568 and 569. In that system, a crystalline information area in an initially amorphous material is written by means of a pulsed and focused radiation beam. The information area is erased by rendering the material amorphous again by means of an erase pulse at the information area. The erase pulse has a shorter pulse duration and a larger amplitude than the write pulse. However, it has been found that upon reading information which has been written after erasure, a read signal is obtained which is not optimum and has a signal-to-noise ratio which is too low.

SUMMARY OF THE INVENTION

It is an object of the present invention to provide a a record carrier of the type described in the opening paragraph in which information written after erasure can also be read satisfactorily.

The invention is based on the recognition that due to the erasure the recording layer does not entirely return to the amorphous state. It is found that small non-amorphous (i.e., crystalline) areas are left behind. After a subsequent write action those small non-amorphous (i.e., crystalline) areas, between information areas which have then been written, impede reading of the record carrier.

The small non-amorphous (i.e., crystalline) areas arise as follows. During erasure, the recording layer is heated by a pulsed radiation beam focused to a radiation spot which locally heats the recording layer with a bell-shaped temperature profile. An area around the center of the profile is heated above the melting point. That central area is generally as large as, or slightly larger than, the crystalline information area. After the beam has been switched off, the central area cools down so rapidly that it solidifies in the amorphous structure. However, the radiation beam also heats an annular area of the recording layer, which is in the amorphous state, around the central area, to a temperature which is lower than the melting point but higher than the crystallization temperature. (The crystallization temperature is the temperature above which an area crystallizes within a period of time commonly used for writing in optical information storage systems, i.e., of the order of 1 µs.) The initially amorphous annular area will entirely or partly crystallize due to this heating. Outside the annular area, the temperature of the recording layer remains below the crystallization temperature so that this layer will not change its structure at that area. Those annular areas produce the above-mentioned read problems.

To crystallize an amorphous area, not only should the temperature of that area be raised above the crystallization temperature, but that area should also remain at that temperature for a sufficiently long time to enable the atoms in the recording layer to order themselves from the amorphous structure into the crystalline structure. The time minimally required for the recording layer to crystallize at a temperature just below the melting point will hereinafter be referred to as the crystallization time. The crystallization time is dependent, inter alia on the material of the recording layer. The time during which an area of the recording layer (e.g., the annular area) is above the crystallization temperature is mainly determined by the pulse duration of the erase pulse and the cooling time, i.e., the time in which the area cools down from a temperature just below the melting point to the crystallization temperature.

According to an aspect of the invention, during erasing, an erase pulse having a short enough pulse duration is used in combination with a short enough cooling time so that the annular area is heated above the crystallization temperature for a period of time which is shorter than the crystallization time so that there will be no crystallization in that area. As a result, that area remains amorphous so that after erasing there are no completely or partly crystalline areas left which may impede reading of newly written information at a later stage.

In spite of the short pulse duration of the erase pulses, crystallization (i.e., creeping crystallization) may still occur under certain circumstances after frequent erasing in areas between the tracks in which the information areas are written. During erasing, areas of the recording layer around the centerline of a track will be melted so that crystalline (i.e., creeping crystalline) areas which are possibly present are effectively erased. However, the areas (midway) between the tracks will at most be heated to a temperature below the melting point and consequently will not be erased.

A record carrier, in accordance with the invention, in which creeping crystallization is inhibited is characterized in that the recording layer has tracks in which the written areas are ordered and there are more crystallization nuclei proximate to the centerlines of the tracks than between the tracks. The low number of crystallization nuclei between the tracks considerably slows down the crystallization in that area. However, a sufficient number of crystallization nuclei should be present around the centerlines of the tracks so that the crystallization of the information areas to be written can be effected sufficiently rapidly during writing.

A record carrier, in accordance with the invention, in which additional crystallization nuclei are provided in a simple manner is characterized in that it has grooves in the middle of the tracks with sharp interfaces in the profile of the tracks, the sharp interfaces constituting the crystallization nuclei. Those tracks can also be used for generating a tracking error signal with which the position of the radiation spot on the record layer can be controlled.

Another embodiment of a record carrier, in accordance with the invention, is characterized in that the reflection of the record carrier with the recording layer in the amorphous structure is larger than that with the recording layer in the crystalline structure. A higher power must be absorbed in the recording layer for erasing a crystalline information area than for writing such an area because the recording layer must be heated above the melting point during erasing, whereas the recording layer is heated below the melting point during writing. By ensuring that the record carrier has a low reflection, hence a high absorption, when the largest quantity of radiation is to be absorbed, i.e., during erasing, the power to be supplied by the radiation source may remain limited.

BRIEF DESCRIPTION OF THE DRAWINGS

These and other aspects of the invention will be apparent from and elucidated with reference to the embodiments described hereinafter in accordance with the drawings, in which:

FIG. 3a shows an initially amorphous recording layer with written crystalline areas;

FIG. 3b shows a graphic representation of temperature profiles in a recording layer as a function of the location during writing and erasing in an initially amorphous recording layer;

FIG. 3c shows a recording layer erased by means of a known method;

FIG. 3d graphically shows temperature variation in a recording layer as a function of time during erasing.

DESCRIPTION OF THE PREFERRED EMBODIMENTS

Figure 1:
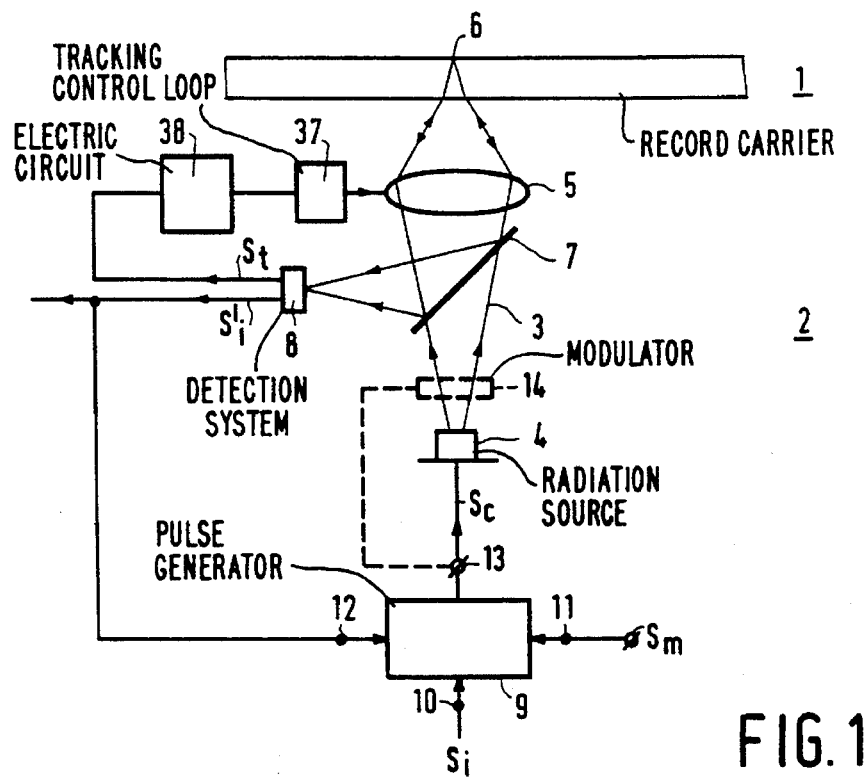
FIG. 1 diagrammatically shows an information storage system.

FIG. 1 shows an information storage system having (a) a record carrier 1 and (b) a device 2 for writing information in the record carrier and for reading and erasing that information. In the device, a radiation beam 3 is generated by a radiation source 4, preferably a diode laser. An objective system 5 focuses the radiation beam to a scanning spot 6 on a recording layer in the record carrier. At least a part of the radiation reflected by the record carrier is directed towards a detection system 8 by a beam splitter 7, for example, a partially transparent mirror. The detection system generates a read signal $S_i'$ which represents the information which is stored on the record carrier from the reflected radiation. The device also includes a pulse generator 9 which generates pulses in dependence upon signals at its inputs 10, 11 and 12. An information signal $S_i$ in which the information to be recorded is coded may be applied to the input 10. A mode signal $S_m$ which indicates whether the pulse generator 9 must supply (a) a constant signal at its output 13 for reading the record carrier, (b) write pulses in accordance with the information signal $S_i$, (c) erase pulses for erasing the information or (d) a combination thereof is applied to the input 11. The read signal $S_i'$ may be applied to the input 12 so as to make the pulse generator 9 function in dependence upon the information stored on the record carrier. The device 2 still further includes a modulator 14 which modulates the intensity of the radiation beam with the signal(s) supplied by the pulse generator. As is shown by means of broken lines in FIG. 1, the output 13 of the pulse generator 9 may be connected to the modulator 14 such that it is arranged in the path of the radiation beam 3. Since the radiation beam of a diode laser can be satisfactorily modulated by means of the current through the diode laser, the pulse generator 9 can also directly control the radiation source (if it is a diode laser for example) as is diagrammatically shown in FIG. 1. In that case, the modulator is integrated with the radiation source (i.e., a radiation source which can be modulated).

Figure 2:
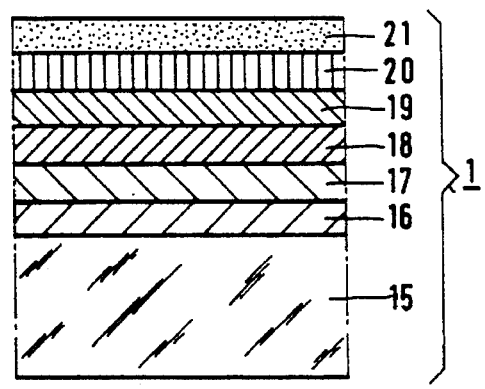
FIG. 2 shows a cross-sectional view of a record carrier.

The record carrier 1, a portion of which is shown in a cross-section in FIG. 2, comprises a transparent substrate 15 on which a stack of the following thin layers are provided: a semi-transparent metal layer 16, a dielectric layer 17, a recording layer 18, a subsequent dielectric layer 19, a subsequent metal layer 10 and possibly a protective layer 21. In the embodiment of the record carrier shown in FIGS. 1 and 2, the radiation beam 3 is incident through the substrate 15 on the stack of layers. The recording layer 18 consists of a phase-change material which can be switched by means of heating it by a radiation beam between a state with an amorphous structure and a state with a crystalline structure. The information can be recorded in the recording layer 18 in a series of information areas, with the state of one structure in an environment with the state of the other structure. The information areas are preferably ordered in juxtaposed tracks. The scanning spot 6 scans a track by moving the scanning spot 6 with respect to the record carrier 1. The information areas can be read by making use of the difference in reflection between the two states of the phase-change material. The scanning beam reflected by the recording layer then has an intensity which is modulated by the succession of information areas. The intensity modulation is converted in the detection system 8 into an electric read signal $S_i'$, i.e., the read signal $S_i'$, which can be processed in a known manner.

FIG. 3a shows a part of the recording layer 18 with two crystalline information areas 23 and 24 in an amorphous environment 28. The centerlines 25, 26 and 27 of three juxtaposed tracks are indicated by the broken lines. The width of the tracks is equal, for example, to the width of the information areas, the tracks being separated by informationless intermediate areas. When an information area is written, the recording layer is locally heated by the radiation beam from room temperature $T_c$ to a temperature above the crystallization temperature $T_r$ and just below the melting point $T_m$ of the recording layer 18. The temperature of the recording layer 18 as a function of the location has a bell-shaped profile 30 as is shown in FIG. 3b. As a result of the just-mentioned heating, an area in the recording layer is with a diameter 31 (see FIG. 3b) is crystallized, i.e., the atoms in the amorphous structure order themselves in a crystalline structure. The minimum time required for this ordering procedure to occur is referred to as the crystallization time. The power in the radiation beam, the period of time of the write pulse and the rate of cooling of the recording layer 18 (i.e., the dielectric layers 17 and 19) determine how long the recording layer 18 will remain above a given temperature. The cooling rate is determined by the thermal properties of the layers at both sides of the recording layer 18 (i.e., the dielectric layers 17 and 19). By correct choice of the pulse duration of the write pulse and the cooling rate, it is possible to have the temperature of the area to be written remain above the crystallization temperature long enough so as to cause the entire area to change from the amorphous state to the crystalline state. In this way, information area 23 (as shown in FIG. 3a) can be written. For areas having a larger length, such as information area 24 (see FIG. 3a), a write pulse having a longer pulse duration is used. This keeps a longer area above the crystallization temperature long enough for it to crystallize completely.

In order to erase the information areas, the crystalline structure of those areas must be converted back into an amorphous structure. To do this, the recording layer 18 is heated above the melting point $T_m$ by an erase pulse so that the recording layer 18 melts and subsequently cools so rapidly at the end of the erase pulse that the recording area 18 solidifies in the amorphous state. The temperature profile of the recording layer 18 at the end of the erase pulse is indicated by the profile 32 in FIG. 3b. An area having a diameter 33 is melted by the erase pulse. The diameter 33 is preferably slightly larger than the diameter 31 of the information area in order to melt the complete information area. The rate at which the layer cools down to the crystallization temperature after the end of the erase pulse may be given a high value by manufacturing thin dielectric layers 17 and 19 of a satisfactorily thermally conducting material and by giving the metal layer 20 a thickness which can rapidly dissipate the heat by conduction in the plane of the metal layer. If a continuous radiation beam were used for erasing a track, the relatively long period of time during which the beam remains above each point of the track would cause the recording layer to be heated well above the crystallization temperature for a long time so that the track to be erased would crystallize completely. To avoid this, the recording layer is heated with erase pulses having a pulse duration which is shorter than that of the write pulses, as is known, inter alia from the above-mentioned article in the IBM Technical Disclosure Bulletin.

Since the publication of the above-mentioned article in the IBM Technical Disclosure Bulletin, it has become known that pulsed erasing of crystalline areas in an amorphous environment does not lead to the desired situation of a fully amorphous recording layer. For this reason, record carriers in which crystalline effects are written in an amorphous layer have been predominantly used for write-once record carriers in which the erasing problem does not occur.

The Applicant has come to the conclusion, confirmed by experiments, that the above-mentioned method of pulsed erasing leads to the results shown in FIG. 3c. FIG. 3c shows a recording layer 18 in which a track has been erased with a series of erase pulses, in which the consecutive heated areas overlap each other. Instead of a uniform amorphous track, a series of amorphous areas 34 surrounded by narrow crystalline areas 35 is obtained. The size of the narrow crystalline areas 35 depends on the erasing conditions and properties of the record carrier. At a subsequent write action, a series of information areas is written over the series of narrow crystalline areas 35, at which action the narrow crystalline areas 35 may subsist completely or partly between or on the edges of the newly written information areas. Consequently, when the newly written information is being read, the read signal $S_i'$ exhibits so much noise caused by the narrow crystalline areas 35, that the read signal $S_i'$ is difficult to process.

The origin of the narrow crystalline areas 35 can be explained with reference to FIG. 3b. The temperature distribution in the recording layer 18 at the location of the scanning spot at the end of the erase pulse is represented by means of the curve 32 of FIG. 3b. The central area below the heating scanning spot 6 will be heated above the melting point $T_m$ over a diameter 33. A surrounding, annular area 35 with an inner diameter 33 and an outer diameter 36 is heated to a temperature between the crystallization temperature $T_c$ and the melting point $T_m$. The annular area 35 will remain in this temperature trajectory during a part of the pulse duration of the erase pulse and the cooling time of the recording layer 18. In the known erasing methods, this time is longer than the crystallization time. Consequently, the annular area will be entirely or partly changed from the amorphous structure to the crystalline structure. After the radiation beam has been switched off, the annular area cools down in this crystalline structure. However, the central area, which is in its molten state during the erase pulse, solidifies at the end of the erase pulse due to the high cooling rate in the amorphous structure. After erasing, narrow crystalline areas 35 are left on the recording layer 18 within an area having a width of approximately diameter 36 minus diameter 33.

The present invention utilizes the above-mentioned recognition of the cause of the poor erasability of the recording layer 18 and provides the possibility of erasing the recording layer 18 satisfactorily. According to the invention, a relatively long crystallization time should be combined with a relatively short erase pulse and a rapid cooling so that the annular area 35 is above the crystallization temperature for a time which is shorter than the crystallization time. Within the duration of the short erase pulse, the annular area 35 will be heated above the crystallization temperature $T_c$, likewise as with the known, long erase pulses. However, before the atoms are able to order themselves in this area in a crystalline structure, i.e., within the crystallization time, the erase pulse is switched off and the recording layer cools down to below the crystallization temperature $T_c$. Consequently, the annular area 35 maintains its amorphous structure. By applying the erase pulses in such a rapid succession that the heated areas form an uninterrupted track, all information written in a track can be erased completely.

Whereas for unwanted crystallization of the annular areas 35 the duration of the erase pulse and the cooling time are important during erasing, only the cooling time is important for rendering the central area 34 (with diameter 33) amorphous. The time spent in the molten state is not important. Consequently, the designer of the record carrier will have the freedom to adapt the cooling rate to the requirements for rendering the central area 34 amorphous by the choice of the layers around the recording layer 18, while the crystallization time can be adapted by choosing the parameters of the recording layer 18 to the minimum pulse duration of the erase pulses to be realized by means of the device 2.

In addition to the crystallization time, the heating time of the recording layer is important for the pulse duration of the erase pulses. FIG. 3d shows the temperature variation T of the recording layer 18 as a function of time t during erasing. This variation holds true for the part of the annular area 35 heated to the highest temperature, i.e., the part adjoining the inner diameter 33. The pulse duration of the erase pulse is denoted by $t_p$. Before the erase pulse, the recording layer 18 is at room temperature $T_r$. At the end of the erase pulse, the part of the recording layer adjoining the inner diameter 33 of the annular area 35 is heated to just below the melting point. The temperature variation during the erase pulse is shown as a straight line, which is a reasonable approximation for heating with a short pulse. At the end of the erase pulse, the recording layer 18 cools down to ambient (i.e., room) temperature as shown in the curve of FIG. 3b. The temperature of the recording layer 18 will be higher than the crystallization temperature $T_c$ during a time $t_1$ during the erase pulse and a time $t_2$ from the start of the cooling period. According to the invention, the sum of these times (i.e., $t_1$ and $t_2$) should be smaller than the crystallization time of the recording layer 18 so as to prevent the recording layer 18 from crystallizing. The time $t_2$ is the previously defined cooling time. For different recording materials it holds that $(T_m - T_r) \approx 2(T_c - T_r)$. For example, for many GeTeSb alloys, it holds that $T_m \approx 630°$ C. and $T_c \approx 300°$ C. It will be evident that for such materials $t_1 \approx \frac{1}{2}t_p$, i.e., the inner portion of the annular area 35 is above the crystallization temperature $T_c$ during half the pulse duration.

A record carrier in which the scanning rate is 1.3 m/s, as is conventional in record carriers of the compact disc type, will hereinafter be considered in describing an example of an implementation of the invention. The record carrier of the example has the structure shown in FIG. 2 and is designed for a radiation wavelength of 780 nm. Specifically, that record carrier has the following structure: a transparent substrate 15 with refractive index n=1.52, a metal layer 16 of 11 nm thick gold with n=0.33–i6.2, a dielectric layer 17 of 142 nm $Ta_2O_5$ with n=2.1, a recording layer 18 of 10 nm $Ge_{42}Te_{42}Sb_{16}$ with n=4.53–i1.17, a dielectric layer 19 of 10 nm $Ta_2O_5$, a metal layer 20 of more than 30 nm thick gold and a protective layer 21. (If the metal layer 20 is more than 30 nm thick, the transmission of the layer for the radiation is negligibly small.) The reflection of the record carrier of the example when the recording layer 18 is in the amorphous state is 71%, and 27% when the recording layer 18 is in the crystalline state. Information areas are written on the record carrier of the example by means of a write pulse having a minimum pulse duration of 770 ns and a power which is sufficient to heat the recording layer 18 just below the melting point $T_m$. By taking a crystallization time of, for example, 400 ns, the recording layer 18 has sufficient time within the write pulse to crystallize so that a crystalline information area is written. The crystallization time is dependent, inter alia, on the chemical composition of the recording layer 18. For a layer of, for example, $GeSb_2Te_4$, the crystallization time can be varied by adding Sb. Without additional Sb, the crystallization time is 50 ns, and with the material $GeSb_4Te_4$, i.e., with additional Sb, the crystallization time is 1 μs. The cooling rate of the recording layer 18 can be varied by means of the thickness of the type of metal of the metal layer 20 and the thickness and thermal conduction of the dielectric layer 19. For the given structure of the record carrier of the example and a thickness of 30 nm of the gold layer 20, the cooling rate is 20 K/ns, and 30 K/ns at a thickness of 100 nm. If the temperature varies linearly with time during the time $t_2$, as is shown in FIG. 3d, and if $T_c$ and $T_m$ have the previously mentioned values of 630° C. and 300° C., respectively, the cooling rate for a gold layer of 30 nm thick is approximately equal to 16 ns. By erasing with pulses of 30 ns, the period of time when the inner portion of the annular (amorphous) area 35 is above the crystallization temperature $T_c$ is approximately 45 ns (i.e., equal to ½*30+ 30= 45), which is shorter than the crystallization time. Consequently, the inner portion of the annular area 35 will not crystallize and remains amorphous. The portion surrounding the annular area has a lower temperature at the end of the erase pulse than the inner portion, as is clearly shown in FIG. 3b, and will consequently cool down more rapidly below the crystallization temperature. The portion surrounding the annular area 35 remains at a temperature above the crystallization temperature $T_c$ for a shorter time than the inner portion. Moreover, the crystallization time increases with a decreasing temperature so that the surrounding portion of the annular area 35 will certainly remain amorphous during erasing. By working with an erasing pulse repetition time between 300 and 700 ns, a continuous amorphous track is obtained.

Figure 4:
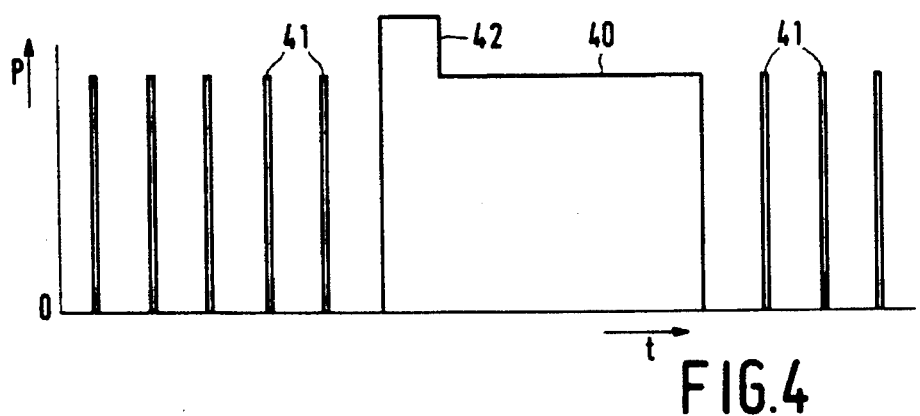
FIG. 4 graphically shows a write pulse and erase pulses for direct overwriting.

Previously written information can be directly overwritten with new information by supplying a write pulse during the time when an information area must be written and by supplying a series of erase pulses between successive write pulses. FIG. 4, which indicates the power P in the radiation beam as a function of time t, shows a write pulse 40 preceded and succeeded by a series of erasing pulses 41. In the case of direct overwriting, the write pulse can be advantageously started with a preheating pulse 42, i.e., a short pulse having a higher power than the subsequent part of the write pulse. The preheating pulse ensures that the recording layer is rapidly heated so that writing starts earlier than in the case of a write pulse without a preheating pulse. This leads to a shorter transition between an erased and a written area and provides the possibility of increasing the information density. With a satisfactory ratio between the power in the preheating pulse and the subsequent part of the write pulse, the written information area acquires a uniform width over the length of the information area. The latter can also be realized by means of a write pulse comprising a series of pulses.

The intermediate areas located just outside the tracks on the recording layer, i.e., outside the diameter 33 in FIG. 3c will be heated above the crystallization temperature $T_c$ during erasing, but only for a short time so that those intermediate areas do not change to the crystalline state during an erasing action. However, the phase-change material has a memory so that crystallization may still occur after repeated erasing. This memory does not lead to problems around the centerline because, due to the layer melting, the memory is erased during each writing action. The unwanted crystallization of the intermediate areas may be obviated by erasing the recording layer between the tracks once after a given number of erasing actions (i.e., the area in which the scanning spot 6 does not scan along the centerline of the tracks). Such a change of the path of the scanning spot can be realized in a known manner by means comprising a tracking control loop 37 which influences, for example, the position of the objective system 5, and an electric circuit 38 for changing the polarity of a tracking error signal $S_t$ which controls the control loop 37 and is generated in the detection system 8. Due to the polarity change, the scanning spot 6 no longer tracks the centerline of a track but a path midway between two neighboring centerlines.

It is also possible to slow down the unwanted crystallization. This can be realized by ensuring that there is a minimum number of crystallization nuclei between the tracks, so that there is a maximum crystallization time. This can be realized by taking a recording layer material having fewer crystallization nuclei. To be able to write such a layer sufficiently rapidly, the number of crystallization nuclei around the centerline of a track should be increased. To this end, a narrow groove may be provided on the centerline, which groove has a width of, for example, one third of the track period and a V-shaped cross-section. It has been found that the sharp bottom and the edges of the groove function as crystallization nuclei.

The unwanted crystallization of the intermediate areas during erasing, caused by the memory of the recording layer, will occur earlier when the pulse duration of the erase pulse is of the same order as the crystallization time. To prevent areas which are still in the amorphous state from becoming crystalline in such a case, it is recommended that the erase pulses be generated only if the scanning spot is present in crystalline areas which must be erased. The erase pulse should not be generated if the scanning spot is present in the areas which are already amorphous. In the period between successive erase pulses, it is possible to read the record carrier. Hence, in accordance with this erasing strategy, erase pulses are generated or not generated dependent on the state, either crystalline or amorphous, of the area where the scanning spot is present. An advantage of this erasing strategy is that the laser is subjected to a smaller load. For the purpose of reading, a radiation beam having a low intensity must be incident on the recording layer 18 between the erase pulses. If this method of reading-before-erasing is not used, it is recommended that the beam be switched off completely between the pulses, for this will increase the cooling rate of the recording layer 18 at the end of an erase pulse.

As will be evident from the foregoing, the power absorbed by the recording layer 18 during erasing should be higher than during writing because the recording layer 18 must be heated to a higher temperature during erasing than during writing. In accordance with further aspects of the invention, the maximum power to be supplied by the device 2 can be limited by forming the record carrier 1 by means of suitable choice of the layers 16, 17, 18, 19 and 20 such that its reflection with the recording layer 18 in the amorphous state is larger than that with the recording layer 18 in the crystalline state. If the record carrier has a small transmission, the absorption in the crystalline state will then be higher, and a larger part of the incident power, than in the amorphous state, will be absorbed. The power of the erase pulses is optimally utilized by maximizing the absorption of the radiation in the recording layer 18 in the state in which the highest power in the recording layer 18 is required, i.e. during erasing. It is true that the power of the write pulses is utilized less optimally, but this is not a drawback because less power is required for writing. With a satisfactory choice of the reflection of the record carrier in the two states, it is possible to write and erase with write and erase pulses of the same power. The pulse generator 9 of the device 2 should then be able to generate only pulses of different pulse duration and equal value. This method is quite suitable for directly overwriting information in a system in which the possible positions of the information areas in the recording layer 18 are fixed. During overwriting, it can then be avoided that the scanning spot is located at an interface between an amorphous area and a crystalline area during a pulse, so that the reflection, averaged across the scanning spot, would have an undefined value and the pulse would not yield the desired write or erasing result.

A record carrier which initially, in the amorphous state, has a high reflection, is compatible with record carriers of the compact disc type in the case of a suitable choice of the amorphous and crystalline reflections. The values of the reflections can be satisfactorily realized in record carriers having a stack of layers which, viewed from the radiation entrance side, comprise MIP, PIM, DIPIM or MIPIM, M is a metal layer, I is a dielectric interference layer, P is a recording layer of phase-change material and D is one or more dielectric layers together forming a reflector.

We claim:

1. A record carrier having a recording layer containing a track, the recording layer having more crystallization nuclei proximate to a centerline of the track than away from the centerline.

2. The record carrier as claimed in claim 1, wherein the track has a groove in the centerline thereof, and the groove has sharp interfaces in a cross-sectional direction of the track constituting crystallization nuclei.

3. A record carrier:
   (a) having a recording layer in which information is writable therein by a write pulse radiation beam which changes an area of the recording layer which has an amorphous structure into an information area having a crystalline structure; and
   (b) which is scannable by an erase pulse radiation beam which erases an information area of the recording layer having a crystalline structure by changing the information area into an area having an amorphous structure;
   wherein an area of the recording layer having an amorphous structure has a reflection which is larger than an information area of the recording layer having a crystalline structure, and the write pulse radiation beam and the erase pulse radiation beam have amplitudes which are substantially equal.

* * * * *